United States Patent [19]
Moran

[11] 3,789,727
[45] Feb. 5, 1974

[54] FASTENER

[75] Inventor: Thomas M. Moran, Cleveland, Ohio

[73] Assignee: Eaton Corporation, Cleveland, Ohio

[22] Filed: June 5, 1972

[21] Appl. No.: 259,422

[52] U.S. Cl. .................................................. 85/71
[51] Int. Cl. ............................................ F16b 13/10
[58] Field of Search...... 85/71, 85, 86, 87, 88, 32 V

[56] References Cited
UNITED STATES PATENTS

| | | | |
|---|---|---|---|
| 1,066,040 | 7/1913 | Osborne | 85/85 |
| 1,255,037 | 1/1918 | Oestricher | 85/32 V |
| 2,376,689 | 5/1945 | Granholm | 85/88 |
| 2,762,252 | 9/1956 | Karitzky | 85/71 |
| 3,006,231 | 10/1961 | Kahn | 85/32 V |
| 3,174,387 | 3/1965 | Fischer | 85/71 |
| 3,437,004 | 4/1969 | Pacharis | 85/71 |

FOREIGN PATENTS OR APPLICATIONS

| | | | |
|---|---|---|---|
| 408,668 | 4/1934 | Great Britain | 85/71 |
| 443,796 | 9/1967 | Switzerland | 85/85 |

Primary Examiner—Marion Parsons, Jr.
Attorney, Agent, or Firm—Teagno & Toddy

[57] ABSTRACT

A molded, one-piece, self-anchoring fastening device adapted for receipt of a threaded member and being self-anchored in an apertured panel or the like. The fastening device is molded in a generally flat position with two joined, substantially cross-sectionally semi-circular or C-shaped complementary sections adapted to be manually folded over upon one another, concave-side-to-concave-side in a preassembled position, to form an axially extending, substantially hollow, cross-sectionally circular device. Each semicircular section carries a loop projecting convexly outwardly from opposed ends of C-shaped section which, in connection with the concave surface, form a substantially circular aperture and which are adapted to coact with the concave surface of the other section upon folding to releasably maintain the sections in a folded position. The apertures defined by the loops partially define the axial passage through the preassembled axially extending hollow body through which the received threaded member must pass.

22 Claims, 11 Drawing Figures

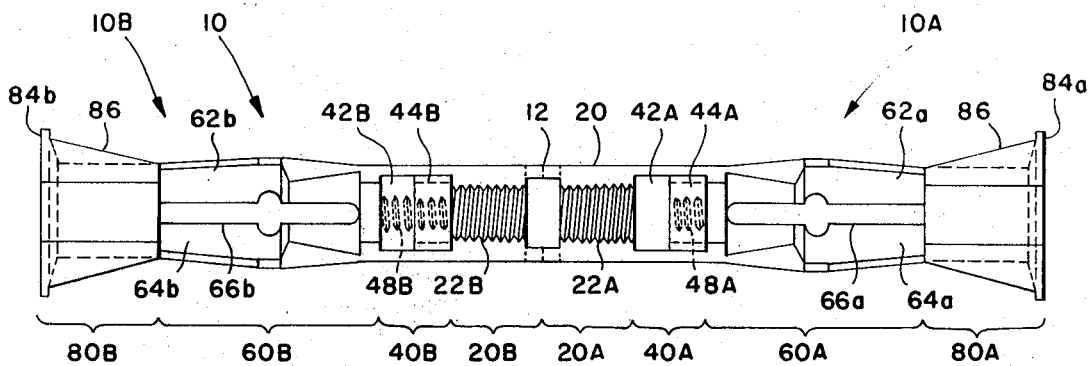
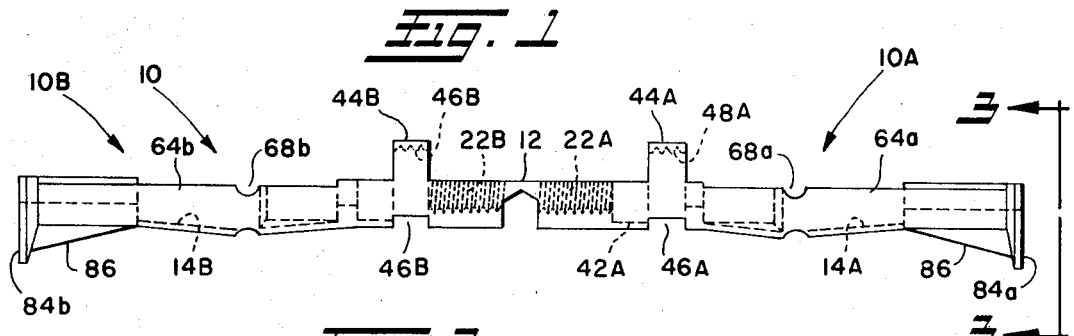
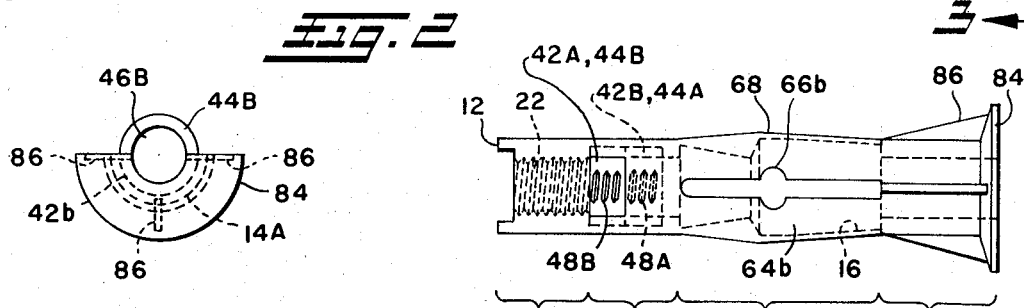
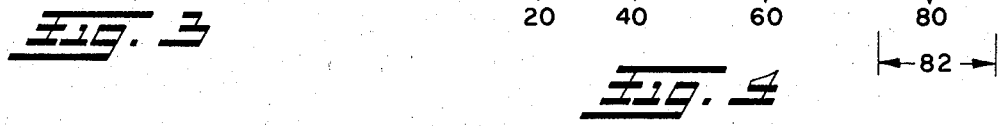
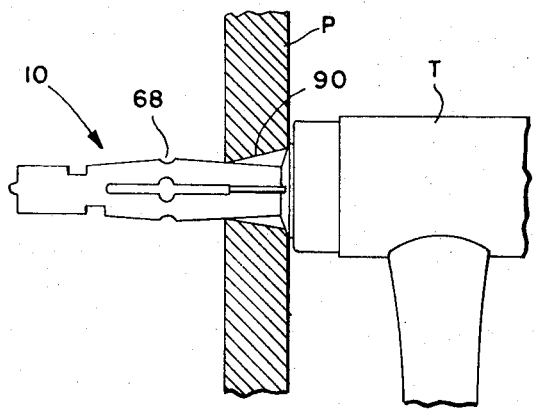
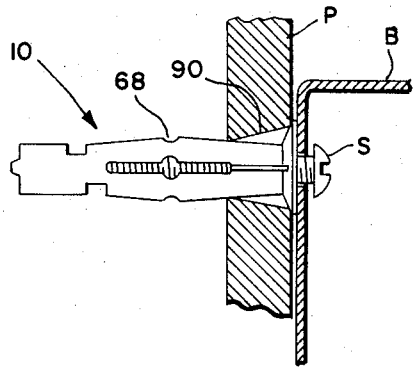

FASTENER

BACKGROUND OF THE INVENTION

1. Field of the Invention

This invention relates to threaded member receiving, self-anchoring fasteners and, more particularly, to molded one-piece, fold-over, screw-receiving fasteners for self-retention in a blind aperture of a work panel, such as plasterboard or the like.

2. Description of the Prior Art

Earlier prior art screw-receiving, self-retaining fasteners, or screw anchors as they were known, were generally of a bulky and complicated metallic structure including a threaded nut portion, such as is seen in U. S. Pat. No. 2,964,989, and other prior art fasteners were not totally satisfactory as the devices were of a costly material, were complicated and expensive to produce and had the tendency to exert damaging forces upon certain types of panels, such as plasterboard, when used in connection therewith. Occasionally, the metallic device also tended to corrode and chemically interact with the anchored workpieces or the received screw.

More recently, molded one-piece, all plastic, toggle action screw anchors have been available which were less costly in material than the older devices and also eliminated the previous corrosion problems. However, these devices were less than satisfactory as they were molded in a solid body configuration requiring a complicated and costly molding procedure to form the toggle action anchor ribs required for self-anchoring and also required either a separate threading operation or self threading of the screw anchor which meant additional means were required to lock the device against turning resulting in possibly damaging forces being applied to panel aperture. Those devices which required self-threading had additional drawbacks as self-threading exposes the fastener to twisting damage or requires an especially heavy-duty part and an especially heavy-duty antirotation means. Self threading fasteners also require the use of self tapping threaded members which may be difficult to obtain or unavailable. The prior art one-piece molded screw anchors were also less than satisfactory as usually only two toggle action anchor ribs, 180° apart, were economically obtainable to absorb the axial and transverse forces. A much more desirable structure utilizes four, six or eight equally-circumferentially spaced anchor ribs to equally absorb the axial and transverse forces at 90°, 60° or 45° circumferential separations respectively. Several of the previous one-piece all-plastic screw anchors were less than totally satifactory as they were effective over only a relatively small range of panel thickness necessitating the production and storage of a large number of different size fasteners as opposed to an ideal fastener which would be available in a few standard sizes capable of self-anchoring in a wide range of panel thicknesses.

SUMMARY OF THE INVENTION

In accordance with the present invention, the drawbacks of the prior art have been overcome to the extent that a molded, one-piece, fold-over, economically-produced, prethreaded, self-anchoring screw-receiving fastener has been provided which is capable of absorbing large axial and transverse forces and is usable over wide ranges of panel thicknesses. The above has been accomplished by forming the fastener of the present invention in two substantially C-shaped or semicircular complementary sections, joined side-to-side or preferably end-to-end, adapted to be folded over, concave-side-to-concave-side, upon one another. Each section includes a convexly outwardly extending loop which, in the folded position, will coact with the concave surface of the other section to maintain the fastener in the folded position for insertion into the panel aperture. The loops also partially form the passage through which the threaded member must pass and thus lock the molded threads in each of the two sections to the threaded member during the anchoring or pull-up operation.

The formation of a molded, one-piece, self-anchoring screw-receiving fastener in two semicircular fold-over sections allows the threads to be molded into each section of the fastener rather than requiring a separate and costly threading operation or requiring self-threading with its inherent added bulk. The formation in two fold-over sections also allows for a multiplicity of toggle action anchor ribs for equal circumferential distribution of axial and transverse forces to be easily obtained simply by providing the required number of axial slits in the molded sections.

The fastener, in the folded or preassembled position, is quite similar to other molded screw-receiving anchors in that it comprises a hollow, generally axially extending body having a driven end for insertion into a panel aperture and a flange end. The fastener is driven into the aperture, usually blind, until the flange engages the panel. A threaded member, or screw, is then inserted into the fastener's axially extending threaded-member receiving cavity. The screw will pass freely through its cavity, part of which is formed by the loops, until it encounters the threaded portion adjacent the driven end. As the screw head engages the flange, the continued rotation of the screw will pull the threaded end axially towards the flanged end which, in connection with the ribs formed intermediate the two ends of the body, will result in the usual toggle anchoring or pull-up as is well known in the art.

Accordingly, it is an object of the present invention to provide a new and improved one-piece all plastic self-retaining fastener.

A further object is to provide an improved, economically-produced, one-piece, all plastic, screw receiving, self-anchoring fastener of the fold-over type.

A further object is to provide a new and improved one-piece, all plastic, self-anchoring fastener molded in two fold-over complementary sections which include molded-in thread and may have any given number of force-absorbing toggle anchor ribs.

These and other objects and advantages of the present invention will be apparent from the following detailed description of the invention taken in connection with the attached drawings.

BRIEF DESCRIPTION OF THE DRAWINGS

FIG. 1 is a top view of the fastener of the present invention as molded.

FIG. 2 is a front view of the fastener of the present invention as molded.

FIG. 3 is a side view of the fastener of the present invention as molded.

FIG. 4 is a top view of the fastener of the present invention in its folded-over or preassembled position.

FIG. 5 is a front view of a preassembled fastener as inserted in a blind aperture of a panel.

FIG. 6 is a front view of the inserted fastener of FIG. 5 with a threaded member and a bracket to be fastened to the panel.

DESCRIPTION OF THE PREFERRED EMBODIMENT

Figure 7:
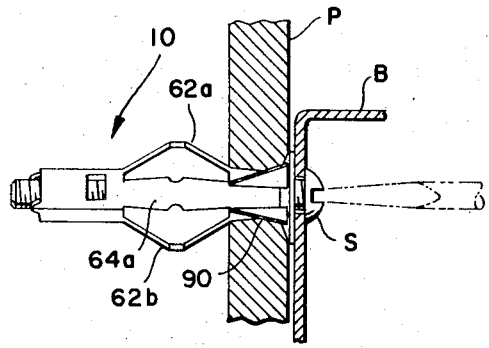
FIG. 7 is a front view of the fastener and threaded member of FIG. 6 wherein the threaded member has been tightened to being the toggle or pull-up installation operation.

The one-piece, all plastic, self-anchoring, threaded member receiving fastener 10, or screw anchor, of the present invention may be seen as molded by reference to FIGS. 1 to 3 and as folded or preassembled, by reference to FIG. 4. The fastener 10 comprises two complementary sections 10a and 10 b which, in the preferred embodiment, are joined end-to-end, as at webs 12, for greater resistance to separation at the driven end 20.

Use of the term "plastic" to describe the present invention is not intended as a limiting term but is intended to cover any suitable moldable material, such as nylon or the like.

Throughout this description of the preferred embodiments, a simple numerical character such as 20 will refer to a specific element or portion of the fastener 10, such as the driven end, while numerical characters with the letters a and b appended, such as 20a and 20b, will refer to the corresponding left and right-hand elements respectively, as they appear in the drawings, of the fastener sections 10a and 10b in the molded or unfolded position. Thus, numerical character 20 refers to a folded or preassembled element, namely the driven end, which is formed by folding complementary elements 20a and 20b upon one another.

Each complementary section 10a and 10b, is substantially identical and comprises the elements discussed below. Each complementary section is generally C-shaped or semicircular in cross section, with the axially extending concave surfaces 14a and 14b respectively adapted, when manually folded over upon one another, to form an axially-extending generally hollow bodied fastener 10 with its internal axially-extending threaded member receiving cavity 14.

Broadly speaking, the fastener 10 and thus each of its complementary portions 10a and 10b comprises a driven end portion 20, a loop portion 40, a toggle-action rib portion 60, and a flange end portion 80.

The driven end sections 20a and 20b have molded-in threads 22a and 22b formed on the concave surfaces thereof. The molded-in threads 22a and 22b are formed so as to align when the sections are foled in the preassembled position to form a smooth continuous thread 22. Webs 12 maintain intact during the folding or preassembled position and add strength and resistance to separation to the preassembled fastener 10 as it is inserted into a panel aperture as will be discussed in detail below. Webs 12 are also formed as not to obstruct axially extending passage or cavity 14 which extends through the preassembled fastener 10.

Axially adjacent the driven end 20, in the axial direction towards the flange end 80, is the loop portion 40 formed from complementary loop sections 40a and 40b. Loop section 40a comprises, moving axially from the driven end 20a towards the flange end 80a, a loop receiving concave cavity 42a and a convexly or circumferentially outwardly extending loop 44a. Complementary loop section 40b comprises, moving axially from driven end 20b towards flange end 80b, a convexly or circumferentially outwardly extending loop 44b and a concave loop-receiving cavity 42b. Loops 44a and 44b are designed to be slightly larger exterior radius than the internal radius of loop-receiving cavities 42b and 42a respectively, to be resiliently received therein in a press fit relationship when the complementary sections 10a and 10b are folded over upon one another to form the preassembled fastener 10. Although the complementary surfaces of the loops 44a and 44b and the complementary surfaces of loop receiving cavities 42b and 42a are shown as being substantially circular in cross section, it is understood that any complementary cross-sectional geometry is equally suitable. It is noted that each loop, in connection with concave surfaces 14a and 14b, has an aperture 46a and 46b therethrough which, in the folded position, forms a portion of the axially extending passageway 16 which extends through the folded hollow body 10.

It is noted that a portion of the concave surface in the body sections 10a and 10b diametrically opposed loops 44a and 44b may be missing or apertured as is shown at 46a and 46b. The use of these apertures serves a dual purpose of saving material and optionally allowing a few partial threads 48a and 48b to be molded into the concave or interior surfaces of loops 44a and 44b. The use of threads 48a and 48b are an optional feature which will improve the toggle action and the toggle pull up torque as will be discussed in greater detail below.

Axially adjacent the loop portions 40a and 40b, in the axial direction of flange ends 80a and 80b are the toggle action rib sections 60a and 60b which are identical and thus only complementary section 60a will be discussed in detail.

Section 60a is comprised of two axially-extending strips or ribs 62a and 64a which are formed by axial slitting of the body 10a as at 66a. At this point it is important to note that a single slit in each section provides four circumferentially spaced toggle action ribs, 42a, 42b, 44a and 44b. However, two slits would result in six ribs, three slits in eight ribs, etc. It may thus be understood the relative ease with which any given number of ribs for even circumferential distribution of transverse and axial forces may be obtained simply by providing the required number of axially extending slits.

Each rib is weakened at an axially intermediate point, as at 68a, by a substantial reduction in width of material, thickness of material or both. Also at the intermediate point the ribs 62 and 64 may be flared outwardly to assure proper radially outwardly spreading and proper toggle action of the ribs as is well known in the art and will be discussed in greater detail below.

Axially adjacent the toggle rib sections 60a and 60b, and distal the driven ends 20a and 20b, are complementary flange end sections 80a and 80b which are identical and thus only 80a will be discussed in detail. The flange end 80 has an axial extension 82 which is approximately equal to the thickness of the apertured panel to which the fastener will self anchor. The flange end includes a radially outwardly extending flange 84 comprised of complementary parts 84a and 84b. Each flange end section may include one or more radially outwardly extending ribs 86 which serve as antirotation means, as is well known in the art.

The above description of sections 10a and 10b in connection with the description of preassembled fasteners 10 indicate the structure of the present invention. Of particular importance is the formation in two sections, 10a and 10b, adapted to be folded over to form the preassembled fastener 10. The use of a fold-over structure allows threads to be molded into the fastener rather than requiring thread cutting or self-threading as was the practice in the prior art one-piece, all-plastic screw anchors. The use of a fold-over structure also permits a desired plurality of circumferentially spaced transverse and axial force absorbing toggle action ribs to be economically obtainable. The use of a fold-over structure is made possible by the use of the loops adjacent the driven end threads which maintain these sections in folded position during insertion into the aperture and also hold the molded threads against the threaded member during the toggle or pull-up operation as will be discussed below.

OPERATION OF THE INVENTION

The operation for installation of fastener 10 of the present invention, as illustrated in FIGS. 5 to 8, is similar to prior art toggle action self-retaining screw anchors as will be apparent from the following description thereof.

FIG. 5 illustrates the installation of the folded or preassembled fastener 10 into a blind aperture 90 of a work panel P such as wallboard, plasterboard, or the like. As was discussed above, the intermediate portion 68 of the toggle action ribs may be flared outwardly to a radial dimension slightly greater than the cross-sectional radius of aperture 90. However, the fastener is resilient and the axially extending slits 66a and 66b allow the toggle action ribs 62a, 62b, 64a and 64b to pass resiliently through the aperture 90 and snap back to their flared position which aids in maintaining the fastener 10 in the aperture. An impacting tool, such as the illustrated hammer T, may be utilized to insert fastener 10 into apertures 90. FIG. 6 illustrates the fastener 10 as utilized with a bracket B which is being attached to the panel P with a threaded member S. It is noted that in FIG. 6 the head of the threaded member or screw S has not yet contacted flange 82 of fastener 10, and thus the toggle-action or "pull-up" has yet to begin.

Reference to FIG. 7 will indicate the beginning of the toggle action, or pull-up, which begins when the head of screw S "bottoms" on flange 82 and screw S is threadedly engaged with molded threads 22 in driven end 20. As screw S is further rotated, the threads 22 cause driven end 20 to be drawn towards the flange end 80 causing the ribs to flare radially outwardly and fold over on each other in the manner well known in the art.

Figure 8:
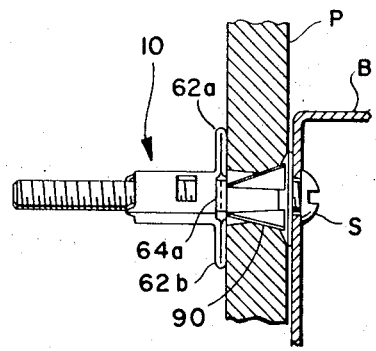
FIG. 8 is a front view of the fastener of the present invention as fully installed and anchoring the threaded member and bracket to the panel.
Figure 8A:
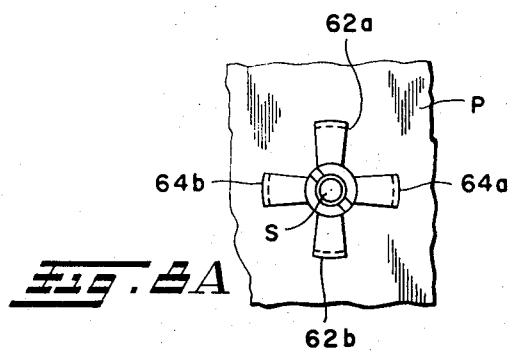
FIG. 8A is an end view of the fastener as fully installed viewed from the leading end.

FIG. 8 illustrates the fastener 10 in its fully self-anchored position wherein screw S is received by the fastener 10 and mounts bracket B to panel P. FIG. 8a, a back view from the blind side of aperture 90, clearly illustrates the formation and final pulled-up position of toggle action ribs 62a, 62b, 64a and 64b which will, as a result of their 90° circumferential spacing, evenly circumferentially absorb axial and transverse forces.

Should screw S be turned after the fastener 10 has assumed the position shown in FIG. 8, the threaded driven end sections 20a and 20b will tend to separate or ratchet which can have an undesirable effect upon the molded threads 22a and 22b. It is in this situation that optional loop threads 48a and 48b are extremely useful. As the driven end begins to separate, loops 44a and 44b are drawn into the threaded member S and the optional threads 48a and 48b tend to lock the thread member against further rotation.

Figure 9:
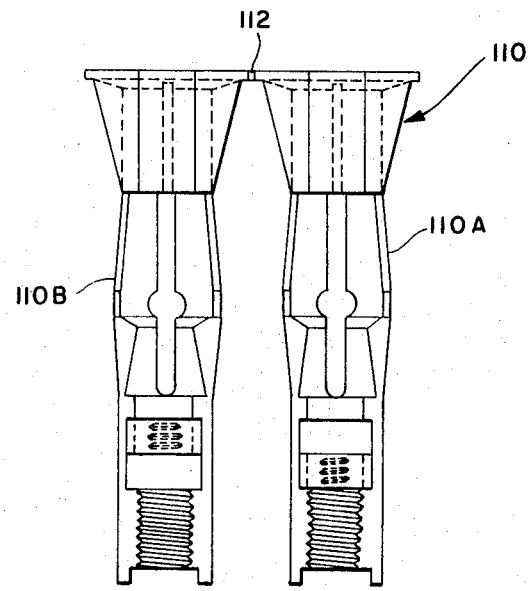
FIG. 9 is a top view of an alternate embodiment of the present invention.

FIG. 9 illustrates an alternate embodiment of the present invention in which fastener 110 is molded in two complementary sections 110a and 110b which are joined side-to-side as at web 112. In all other aspects fastener 110 is identical to fastener 10, and thus will not be described in further detail.

Figure 10:
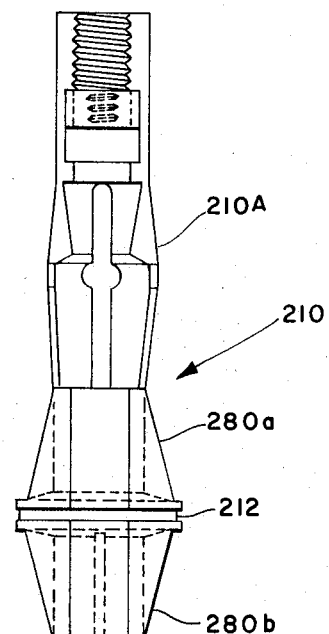
FIG. 10 is a top view of a further alternate embodiment of the present invention.

FIG. 10 illustrates an additional alternate embodiment of the present invention in which fastener 210 is molded in two complementary sections 210a and 210b which are joined flange end 280a to flange end 280b by means of webs 212. In all other aspects fastener 210 is identical to fasteners 10 and 110 described above, and thus will not be described in further detail.

Although this invention has been described in its preferred form with the certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A molded one-piece fastener adapted to receive a threaded member and adapted for insertion into and toggle action self anchoring with the opposite side of an apertured panel, said fastener being molded in two joined, substantially cross-sectionally semicircular complementary sections adapted to be manually folded over upon the other, concave-surface-to-concave surface, to form an axially extending hollow body having an axially extending threaded member receiving cavity therethrough, said body having an internally threaded driven end and a distal flange end, each of said complementary sections comprising:
   a driven end portion for insertion through a panel aperture, said driven end portion having molded threads on the concave surface thereof;
   at least one convexly extending loop; and
   one concave loop-receiving cavity for each loop extended from said complementary section, said loop-receiving cavity receiving the loop extending from the other complementary portion in a resilient interference fit relation when said sections are folded over upon one another to maintain said sections in said folded relation, said loops partially defining said axially extending threaded member receiving cavity.

2. The fastener of claim 1 wherein said loops and said loop-receiving cavities define a loop portion, said loop portion being axially adjacent said internally-threaded driven end.

3. The fastener of claim 1 wherein said molded threads in each complementary section are positioned to cooperate with the other complementary section molded threads to form a substantially continuous thread when said sections are in a folded position.

4. The fastener of claim 1 wherein said sections are joined driven-end-to-driven-end by a plurality of web means.

5. The fastener of claim 2 wherein said complementary sections additionally comprise a toggle action rib section interposed said flange end and said loop portion, each of said rib sections comprising a plurality of axially-extending strips separated by axially-extending slits.

6. The fastener of claim 5 wherein said strips are weakened at an intermediate point by a reduction in material.

7. The fastener of claim 6 wherein said strips are radially outwardly flared at said intermediate point.

8. The fastener of claim 5 wherein said strips are adapted to extend radially outwardly at equal circumferential intervals upon self-anchoring of said fastener to the apertured panel.

9. The fastener of claim 8 wherein the number of toggle action ribs is dependent upon the number of axial slits in each complementary section.

10. The fastener of claim 2 wherein the concave surface of each loop carries at least a partial molded thread.

11. The fastener of claim 5 wherein said flange portion comprises a radially outwardly extending flange adapted to engage the apertured panel upon proper axial insertion of said driven end through said panel aperture.

12. The fastener of claim 11 wherein said flange portion additionally comprises a plurality of radially outwardly extending members adapted to engage said panel and maintain said fastener rotationally fixed to said panel.

13. A molded one-piece fastener adapted to receive a threaded member and adapted for toggle action self-anchoring in an apertured panel; said fastener being molded in two joined, substantially cross-sectionally semicircular complementary sections adapted to be manually folded over upon the other, concave-surface-to-concave-surface, to form an axially extending hollow body having an axially extending threaded member receiving cavity therethrough, said body having an internally threaded driven end and a distal flange end, each of said complementary sections comprising:
- a driven end portion having molded threads on the concave surface thereof, the molded threads of each section adapted to cooperate with the molded threads of the other section to form a continuous thread upon folding of the sections;
- a loop portion adjacent said driven end, said loop portion comprising at least one convexly extending loop, said convexly extending loop having a molded thread on the interior surface thereof, and one concave loop receiving cavity for each loop of the other complementary section, said loop receiving cavity receiving the loop extending from the other complementary section in a resilient interference fit relation when said sections are folded over upon one another to maintain said sections in a folded relation; said loops partially defining said axially extending threaded member receiving cavity;
- a toggle action rib portion interposed said loops and said flange end, siaid toggle action rib section comprising a plurality of axially extending strips separated by axially extending slits, said axially extending strips weakened at an intermediate point by the reduction of material thereat, said strips being radially outwardly flared at said intermediate point; and
- a flange end comprising a radially outwardly extending flange adapted to engage the apertured panel upon proper axial insertion of said driven end through said aperture.

14. The fastener of claim 13 wherein said complementary sections are joined driven end-to-driven-end by means of at least one flexible member extending therebetween.

15. The fastener of claim 13 wherein said complementary sections are joined side-by-side by means of at least one flexible member extending therebetween.

16. The fastener of claim 13 wherein said complementary sections are joined flange-end-to-flange-end by means of at least one flexible member extending therebetween.

17. A molded one-piece axially extending toggle action self-anchoring fastener formed from two joined axially-extending complementary sections and having an axially extending threaded member receiving cavity therethrough, said fastener comprising:
- an internally threaded driven end;
- at least one loop extending from each section, said loop resiliently engaging said other section when said sections are manually folded over upon one another, said loops partially defining said threaded member receiving cavity;
- a flange end; and
- a toggle action rib section interposed between said loops and said flange end.

18. The fastener of claim 17 additionally comprising a plurality of flexible webs joining said sections at the driven ends thereof.

19. The fastener of claim 18 wherein said loops have a partial thread molded on the interior thereof.

20. The fastener of claim 19 wherein said flange end includes radially outwardly extending antirotation means.

21. The fastener of claim 18 wherein said toggle action rib section comprises a plurality of axially extending strips separated by axially extending slits, said strips weakened at an intermediate point by a relative reduction of material thereat.

22. The fastener of claim 21 wherein said strips are radially outwardly flared at said intermediate point.

* * * * *